United States Patent

Breeden et al.

Patent Number: 5,202,912
Date of Patent: Apr. 13, 1993

[54] METHOD AND APPARATUS FOR PROVIDING TELEPOINT TO TELEPOINT CALLING BETWEEN PAGER EQUIPPED HANDSETS

[75] Inventors: Robert L. Breeden, Boca Raton; Prabhakar Muppidi, Boynton Beach; Richard E. Beasom, Boca Raton, all of Fla.

[73] Assignee: Motorola, Inc., Schaumburg, Ill.

[21] Appl. No.: 756,944

[22] Filed: Sep. 9, 1991

[51] Int. Cl.$^5$ .................. H04M 11/00; G08B 5/22
[52] U.S. Cl. ............................. 379/57; 379/58; 379/61; 340/825.44; 340/825.36; 340/825
[58] Field of Search .................. 379/56, 57, 58, 61, 379/90, 93, 96; 455/31.1, 33.2; 340/825.44, 825.36, 825

[56] References Cited

U.S. PATENT DOCUMENTS

| | | | |
|---|---|---|---|
| 4,661,972 | 4/1987 | Kai | 379/57 |
| 5,058,201 | 10/1991 | Ishii et al. | 455/33.1 |
| 5,086,451 | 2/1992 | Saegusa et al. | 379/58 |
| 5,090,051 | 2/1992 | Muppidi et al. | 379/61 |
| 5,111,197 | 5/1992 | Ichikuwa | 340/825.44 |
| 5,153,903 | 10/1992 | Eastmond et al. | 379/57 |

FOREIGN PATENT DOCUMENTS

0212761A2  3/1987  European Pat. Off. .

OTHER PUBLICATIONS

MPT 1375 Common Air Interface Specification published by the Department of Trade and Industry, London, England, May 1989.
Appendix A to Motorola Paging System Planner RO-4-0-02-A, Alphanumeric Protocols, Automatic Input of Alphanumeric Messages, pp. A-1 to A-6, published Sep. 1987 by Motorola, Inc.

Primary Examiner—Curtis Kuntz
Assistant Examiner—William D. Cumming
Attorney, Agent, or Firm—Philip P. Macnak; William E. Koch; Thomas G. Berry

[57] ABSTRACT

Communication between first (38, 40 or 42) and second (38, 40 or 42) portable radiotelephone transceivers is provided in a radiotelephone communication system by generating a paging message (500-512) in response to the first transceiver (38, 40 or 42) registering with a first telepoint base station (32, 34 or 36). The paging message (500-512) is directed to the second transceiver (38, 40 or 42) for which communication is requested, and identifies the first telepoint base station (32, 34 or 36) and the first transceiver (38, 40 or 42). Upon receiving the paging message (500-512), the second transceiver (38, 40 or 42) registers with a second telepoint base station (32, 34 or 36), downloading the information identifying the first telepoint base station (32, 34 or 36) and the first transceiver (38, 40 or 42). The second telepoint base station (32, 34 or 36) establishes communication with the first telepoint base station (32, 34 or 36), after which the first telepoint base station (32, 34 or 36) requests registration of the first transceiver (38, 40 or 42) to complete the communication between first (38, 40 or 42) and second (38, 40 or 42) transceivers.

22 Claims, 9 Drawing Sheets

FIG. 1

*PRIOR ART*

METHOD AND APPARATUS FOR PROVIDING TELEPOINT TO TELEPOINT CALLING BETWEEN PAGER EQUIPPED HANDSETS

BACKGROUND OF THE INVENTION

1. Field of the Invention

The present invention relates generally to the field of cordless radiotelephone communication systems, and more specifically to a cordless radiotelephone communication system providing telepoint to telepoint calling between pager equipped handsets.

2. Description of the Prior Art

Figure 1:
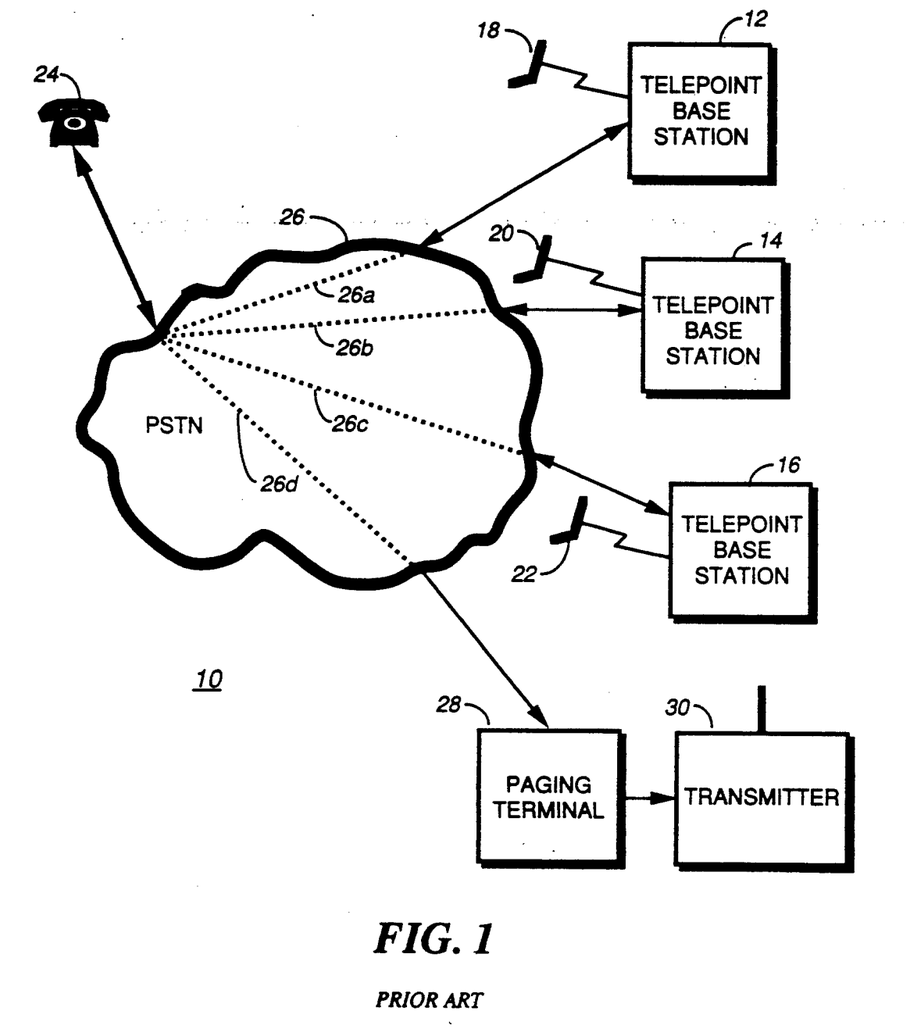
FIG. 1 is a block diagram of a prior art cordless telephone communication system.

Telepoint base stations, such as 12, 14, or 16, used in a CT-2 (second generation cordless telephone) communication system 10 as shown in FIG. 1, have previously been designed for outbound calling only, i.e. to handle telephone calls originated by CT-2 handsets, such as 18, 20 or 22 which were placed at the telepoint base stations 12, 14, or 16, respectively. The calls were then routed to a conventional telephone 24 through connections 26a, 26b or 26c established through the public switched telephone network 26. There were at least three main reasons for CT-2 system service providers having established the restrictions on outbound calling only. In the first place, most service providers wanted to keep the telepoint telephone access number (TTAN) of each telepoint base station unpublished in order to reduce the opportunities provided for electronic vandalism. Secondly, even if the telepoint telephone access numbers (TTANs) of each telepoint base station were published, a caller attempting to establish communication with a particular CT-2 handset would in most instances not know which telepoint base station was to be contacted in order to reach a particular handset subscriber, unless some prior arrangement had been made. And thirdly, by allowing calls to the telepoint base stations by callers hoping to contact particular CT-2 handset subscribers, the system service provider would temporarily be deprived of potentially revenue producing telephone channels, because such channels would be more frequently tied up due to the inbound calling which would potentially have little likelihood for call completion, thus restricting the number of outbound calls which could be placed at any telepoint base station.

One approach which had been previously proposed to handle inbound calls to the CT-2 handsets 18, 20 or 22, was to utilize in combination an independent pager and a CT-2 handset. When a caller, calling from a conventional telephone 24, wished to reach a particular CT-2 handset subscriber, the caller would first place a call through a connection 26d established through the public switched telephone network 26, as shown in FIG. 1, to a paging terminal 28 in order to send a data message containing the caller's phone number. The data message was then transmitted by the transmitters 30 (only one of which is shown) throughout the paging system. The caller then had to hang-up and wait for a call-back from the paged CT-2 handset subscriber. The pager-in-handset approach could thus be utilized by a caller to locate any handset anywhere within the coverage area of the associated paging system to provide inbound calling from any phone coupled to the public switched telephone network.

However, such a prior art system as described above, and shown in FIG. 1, would not enable a first CT-2 handset subscriber, located at one of the telepoint base stations, or telepoint locations, to communicate with another CT-2 handset subscriber located at another telepoint location, because such prior art systems did not provide any apparatus or method for communicating between the telepoint base stations. There is a need to provide a method and apparatus for handling calls originated by one CT-2 handset subscriber to another CT-2 handset subscriber. And, such a method and apparatus must be able to function when the second CT-2 handset subscriber is located near a CT-2 telepoint base station, or can be within reach a CT-2 telepoint base station in a reasonably short period of time.

SUMMARY OF THE INVENTION

In accordance with one aspect of the present invention, in a communication system providing at least cordless radiotelephone operation and having a plurality of telepoint base stations geographically located therein for providing communication between a plurality of portable radiotelephone transceivers and a public switched telephone network, a system for establishing communication between transceivers having a paging receiver coupled thereto comprises a first and at least a second telepoint base station. The first telepoint base station comprises means for registering a first transceiver of the plurality of portable radiotelephone transceivers for enabling the transmission of access information identifying a second transceiver to which communication is desired, and means for establishing a connection with a paging system over a communication network for enabling a paging message transmission directed to the second transceiver; the paging message transmission including at least access information identifying the first telepoint base station and access information identifying the first transceiver. The second telepoint base station comprises means for registering the second transceiver in response to the same receiving the paging message and for enabling the transmission of access information identifying the first transceiver to which communication is desired, and means for establishing a communication link with the first telepoint base station in response to registering the second transceiver, and for sending to the first telepoint base station the access information identifying the first transceiver. The first telepoint base station further comprises means for requesting registration of the first transceiver in response to the received access information identifying the first transceiver to enable a completion of the communication between the first and second transceivers.

In accordance with another aspect of the present invention, a portable radiotelephone transceiver is capable of operation in a communication system providing at least cordless radiotelephone operation and having a plurality of telepoint base stations geographically located therein for providing communication between a plurality of portable radiotelephone transceivers and a public switched telephone network, and for further providing communication between portable radiotelephone transceivers. The portable radiotelephone transceiver comprises a means for receiving, a means for storing, a means for displaying, and a means for transmitting. The means for receiving a paging message receives the message which includes at least access information identifying a first telepoint base station and access information identifying a first portable radiotelephone transceiver requesting communication. The means for storing stores the received access information identifying the first telepoint base station and access information identifying the first portable radiotelephone transceiver. The means for displaying displays at least the received access information identifying the first portable radiotelephone transceiver. The means for transmitting transmits the access information identifying the first telepoint base station to a second telepoint base station and further transmits the access information identifying the first portable radiotelephone transceiver to the second telepoint base station to thereafter enable communication between said portable radiotelephone transceivers.

DESCRIPTION OF THE PREFERRED EMBODIMENTS

Figure 2:
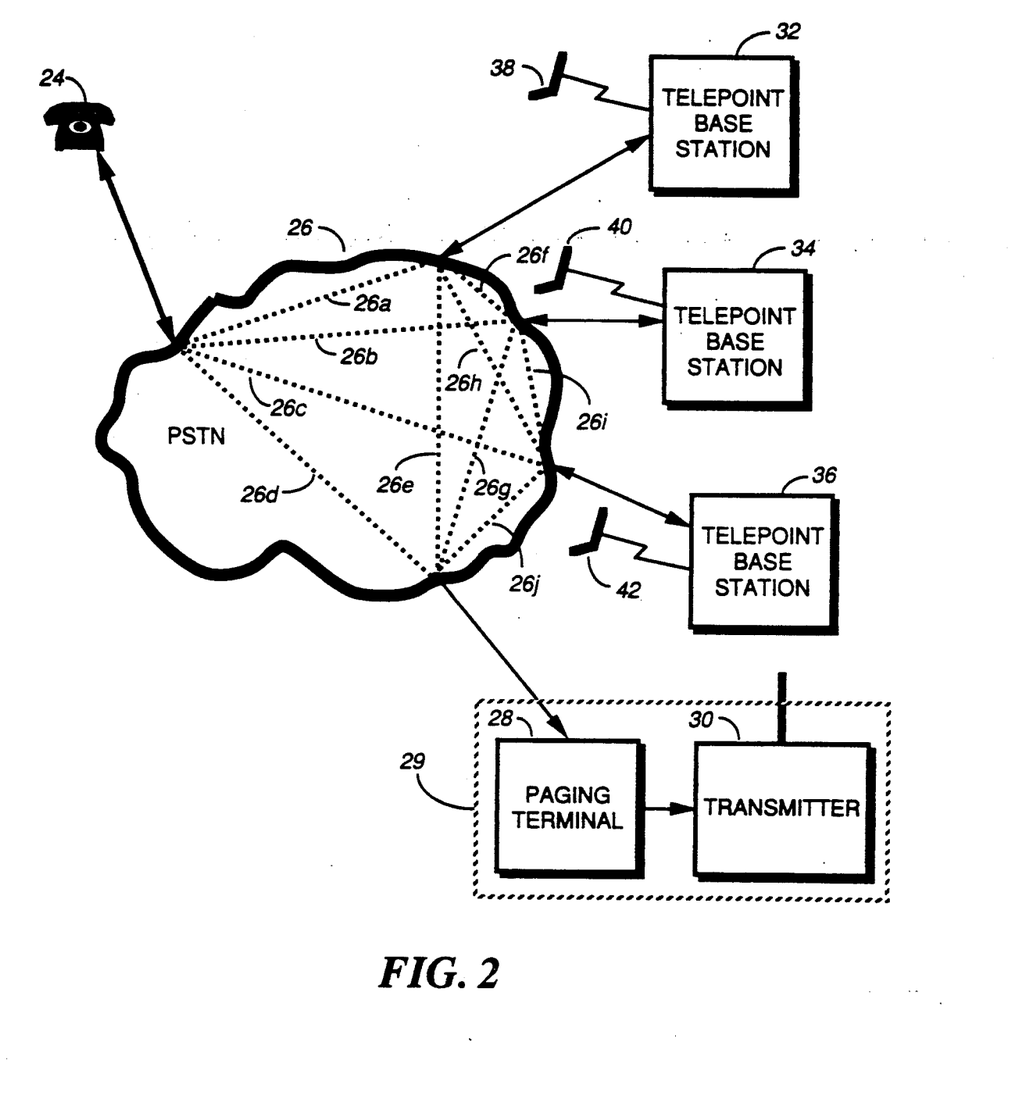
FIG. 2 is a block diagram of a cordless telephone communication system in accordance with the preferred embodiment of the present invention.

Reference is directed to FIG. 2 which is a block diagram of a cordless telephone communication system in accordance with the preferred embodiment of the present invention. Unlike the prior art cordless communication system as shown and described in FIG. 1, the cordless telephone system in accordance with the preferred embodiment of the present invention enables a first CT-2 handset such as handset 38, 40 or 42 to communicate directly with a second CT-2 handset using the associated telepoint base stations 32, 34 or 36 to establish a communication link 26f, 26h or 26i through the public switched telephone network 26, thereby enabling communication between handsets in a manner which will be described in detail below. Each of the telepoint base stations 32, 34 or 36 is also capable of establishing a communication link 26e, 26g or 26j through the public switched telephone network 26 to a paging terminal 28, to enable the transmission of information necessary to complete the communication link between telepoint base stations over a wide area paging system, also as will be described in detail below.

Figure 3:
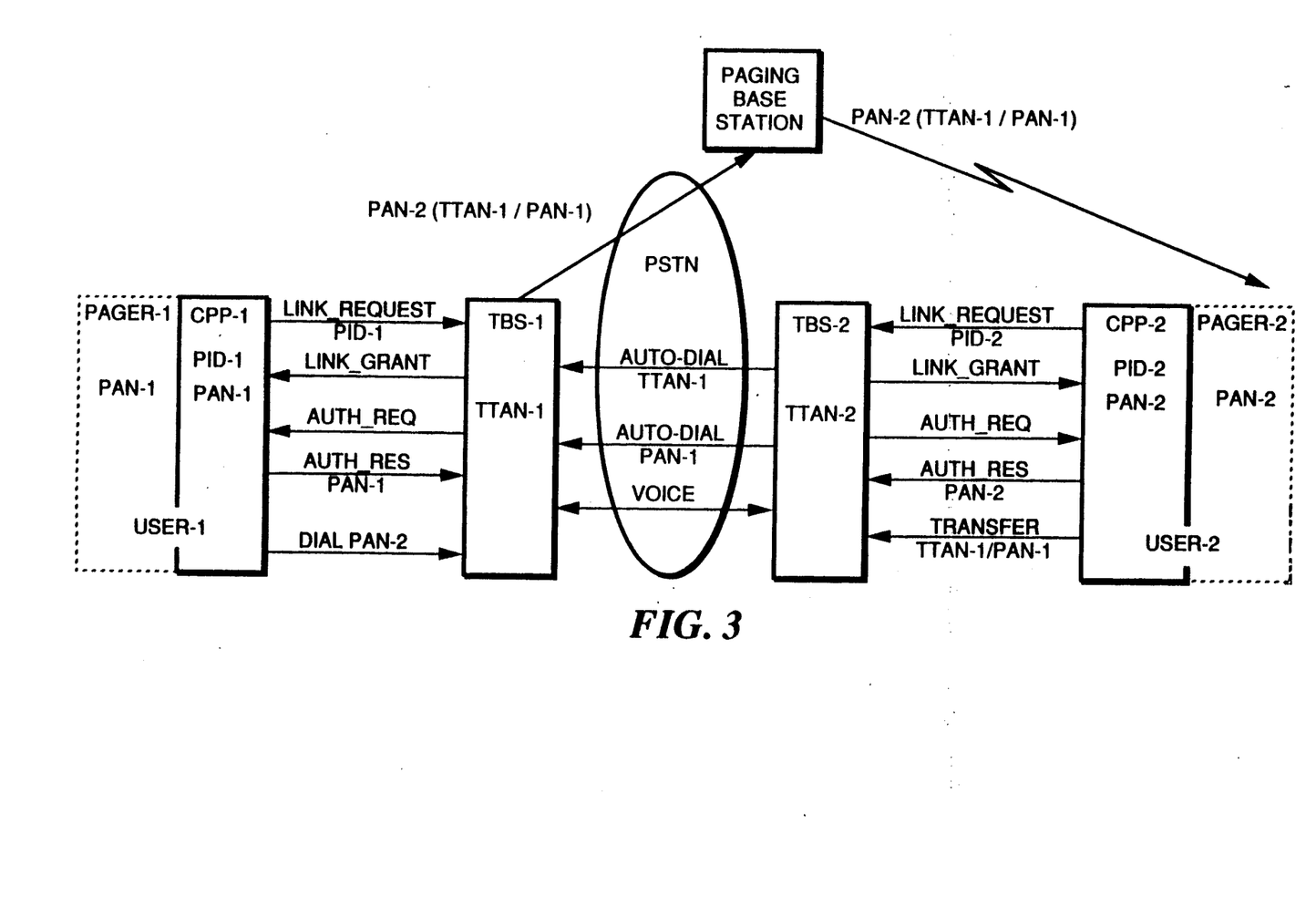
FIG. 3 is an example of the signal flow relating to the system of FIG. 2.

Reference is directed to FIG. 3 which is an example of the signal flow necessary to provide communication between a first CT-2 handset and a second CT-2 handset in accordance with the preferred embodiment of the present invention. As shown in FIG. 3, each portable cordless telephone user, USER1 and USER2 have handsets which comprise a pager portion, PAGER-1 and PAGER-2 and a cordless telephone portion, CPP-1 and CPP-2. Each of the pager portions, PAGER-1 and PAGER-2 are assigned unique pager access numbers, PAN-1 and PAN-2 respectively, corresponding to the pager address, in a manner well known for use in paging systems. Each of the cordless telephone portions, CPP-1 and CPP-2 are assigned unique portable identification numbers, PID-1 and PID-2 respectively, which identify the handsets, in a manner well known for use in CT-2 cordless telephone systems. Each of the cordless telephone portions, CPP-1 and CPP-2 are also programmed to transmit the pager access number, PAN-1 and PAN-2, associated therewith in the Telepoint Registration Data (TRD) field which is normally utilized to provide service provider related information. Each of the telepoint base stations TBS-1 and TBS-2, as shown, are assigned unique telepoint telephone access numbers, TTAN-1 and TTAN-2 respectively, which enable inbound communication access to each telepoint base station. While only two handsets and two telepoint base stations are illustrated in FIG. 3, the operation of a cordless telephone system in accordance with the preferred embodiment of the present invention can also be applied to a greater number of handsets with a greater number of telepoint base stations as will become apparent with the description to follow.

In the description of the signal flow which is provided in FIG. 3, it will be appreciated that only those signal items which are specifically related to the operation of the cordless telephone system in accordance with the preferred embodiment of the present invention will be described in detail. A description of the complete signaling protocol which is utilized in CT-2 cordless telephone systems can be found in the Common Air Interface Specification MPT 1375 published by the Department of Trade and Industry in London, England.

Figure 7:
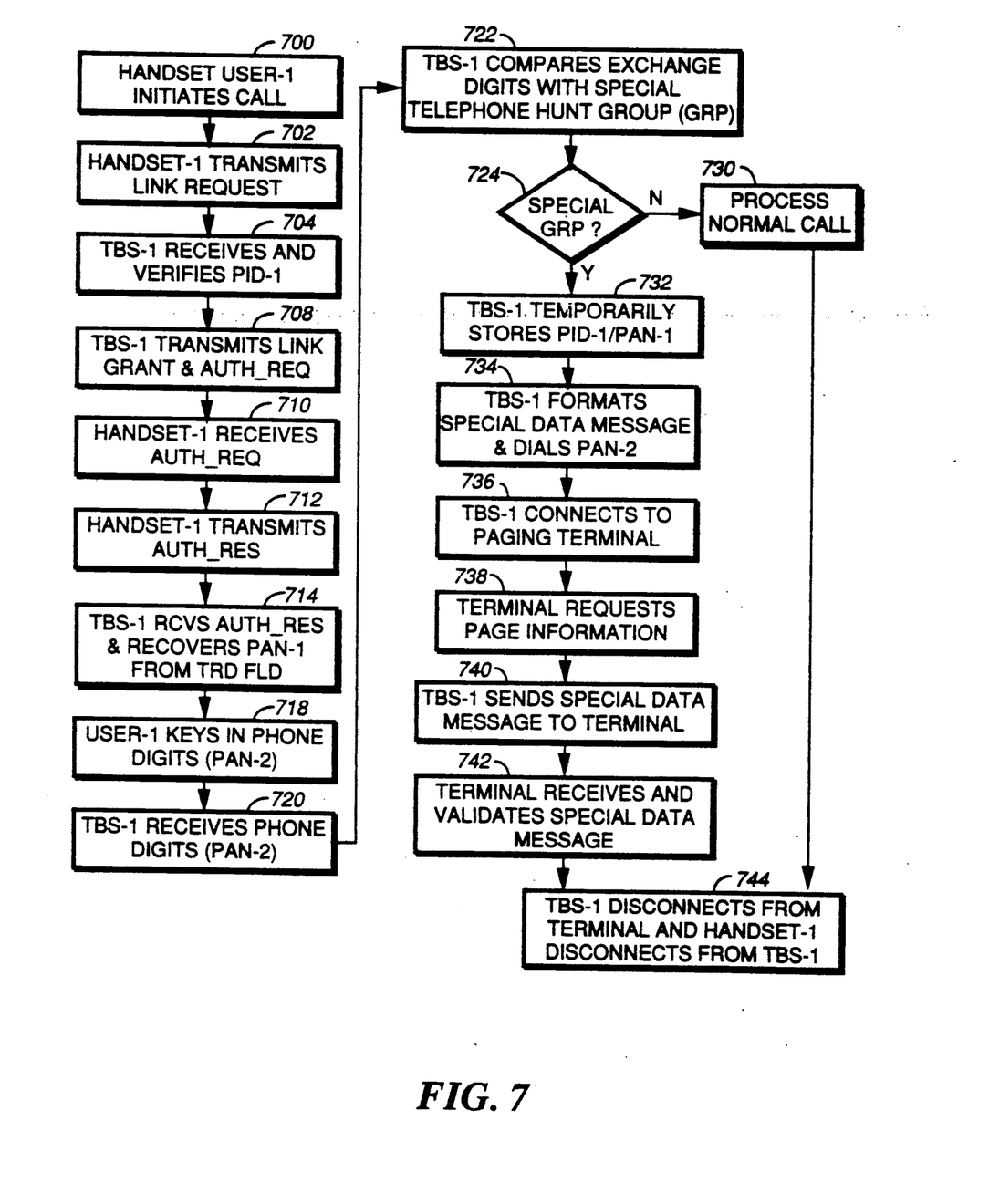
FIG. 7 is a flow chart illustrating the telepoint base station outbound call handling operation in accordance with the preferred embodiment of the present invention.
Figure 8A:
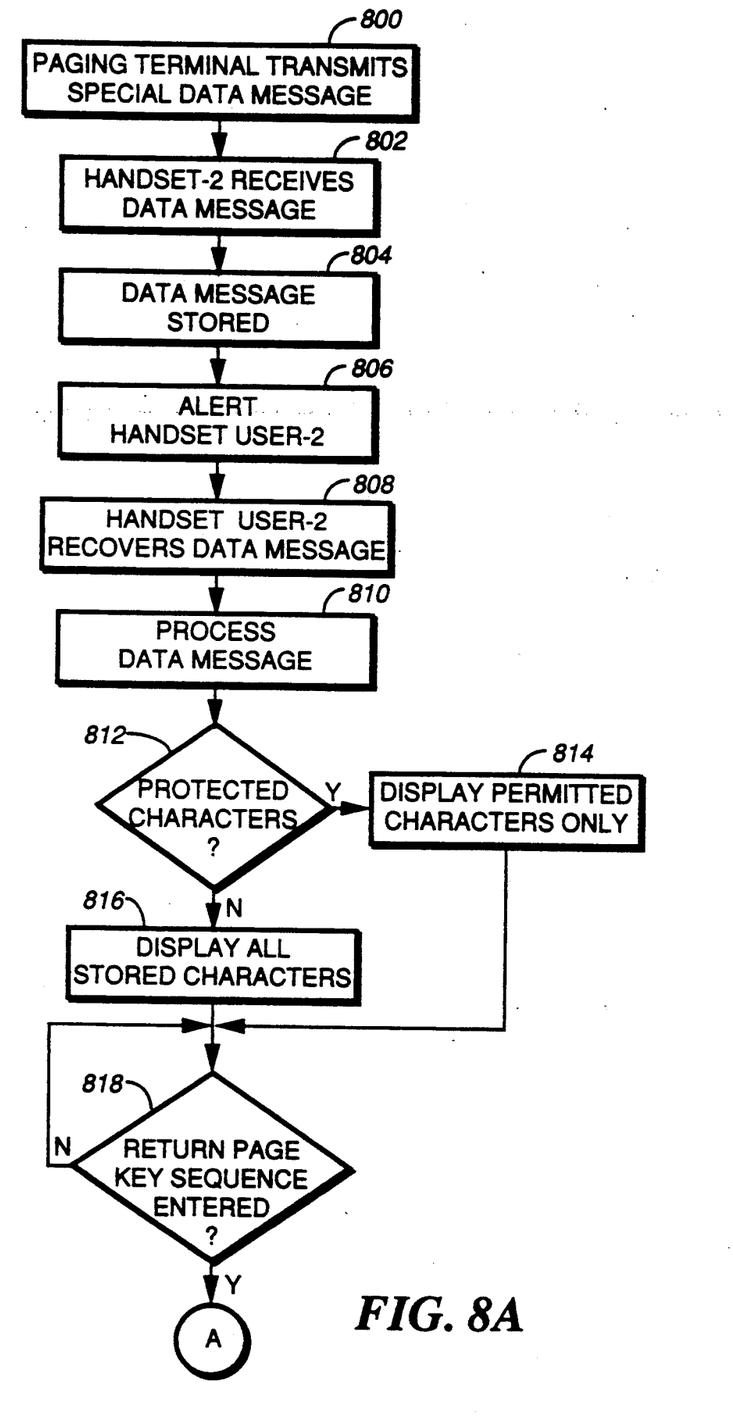
FIGS. 8A and 8B are flow diagrams illustrating the cordless telephone handset operation in accordance with the preferred embodiment of the present invention.
Figure 8B:
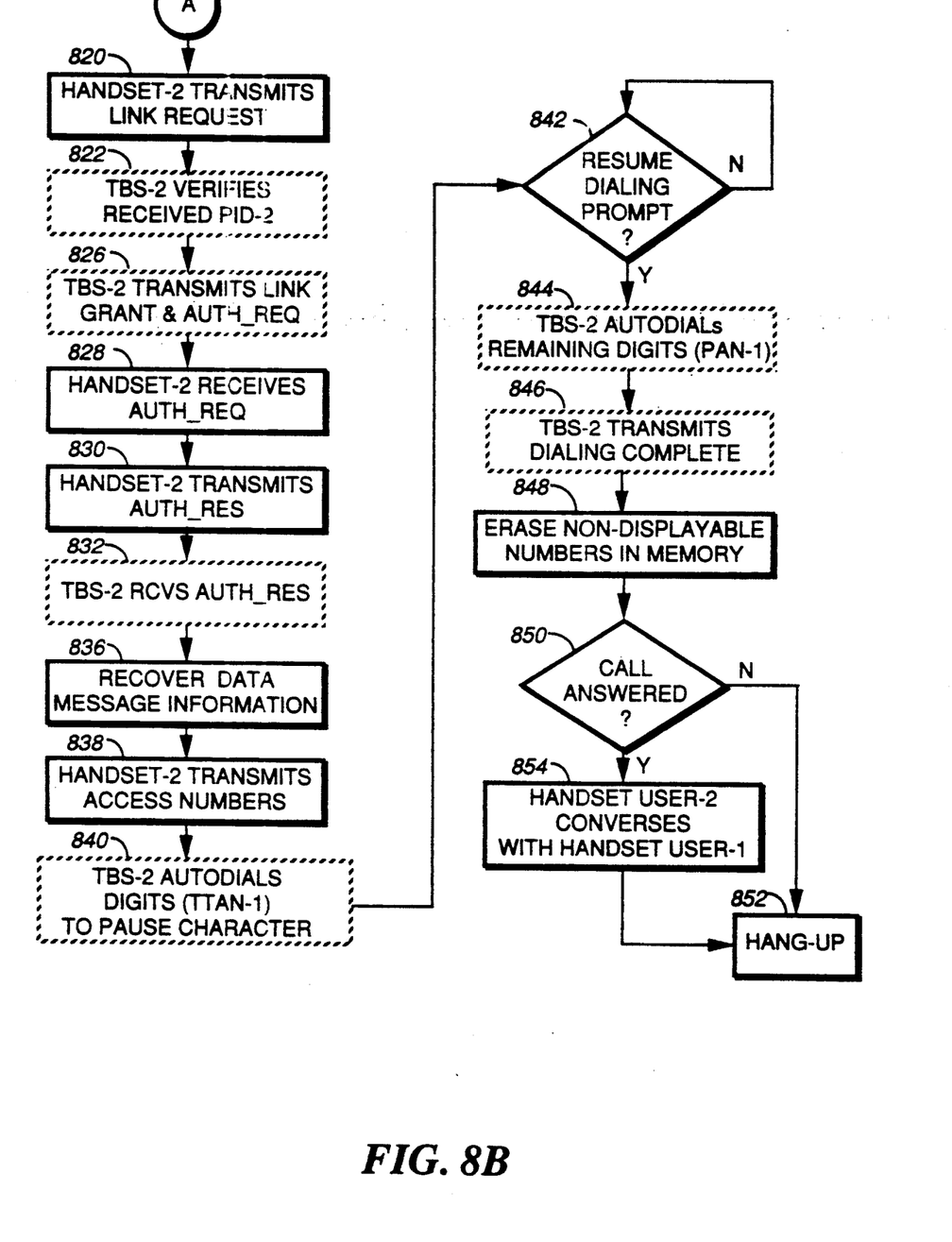

The signal flow diagram of FIG. 3 is best understood when considered in conjunction with the flow charts of FIGS. 7, 8A and 8B. Referring first to FIG. 3 in conjunction with FIG. 7 which is a flow chart illustrating the telepoint base station outbound call handling operation in accordance with the preferred embodiment of the present invention, when a first handset user, such as handset USER1 initiates a call, at block 700, which may or may not be directed to a second handset user, HANDSET-1 initially transmits a link request, at block 702. Transmitted within the link request is the handset portable identification number PID-1 in a manner well known to one of ordinary skill in the art. The telepoint base station TBS-1 receives the link request, at block 704 and verifies that the handset user, USER-1, identified by the received PID-1 is authorized to operate in the system. When USER-1 is authorized to operate in the system, the telepoint base station TBS-1 transmits a link grant, at block 708, followed by an authorization request, AUTH_REQ, which is used in the call authentication process. The handset HANDSET-1 receives the authorization request, AUTH_REQ, at block 710 and then transmits an authorization response, AUTH_RES, at block 712. The authorization response, AUTH_RES, includes the paging receiver access number, or PAN-1, which is pre-programmed for transmission in the telepoint registration data field, or TRD field. The telepoint base station TBS-1 receives the authorization response, AUTH_RES, at block 714 and among other things, recovers the received PAN-1 transmitted in the telepoint registration data field, TRD FLD. Following the reception of the authorization response, AUTH_RES, at block 714, the telepoint base station TBS-1 generates a dial tone which is received by the handset user, USER-1, indicating the user can now dial the telephone number for which the call is directed. The handset user, USER-1, then keys in the digits corresponding to the telephone number, at block 718. The telephone number may correspond to a telephone number for a conventional telephone receiver, or in the preferred embodiment of the present invention, corresponds to the paging receiver access number, PAN-2, for the second handset, HANDSET-2. The telepoint base station TBS-1 receives the user inputted telephone number, PAN-2, at block 720, and then compares the telephone number, or a portion thereof, such as the exchange portion, or first three digits, of the number with the special telephone hunt group (GRP) to which other CT-2 handsets operating in the system are assigned to enable handset to handset communication, at block 722. When the received telephone number is not assigned to the special telephone hunt group, at block 724, the received number corresponds to a phone number identifying a conventional telephone, and the call is processed in a manner well known to one of ordinary skill in the art, at block 730, after which the handset HANDSET-1 disconnects from the telepoint base station TBS-1, at block 744.

When the received telephone number is assigned to the special telephone hunt group, at block 724, the telepoint base station TBS-1 temporarily stores the portable identification number PID-1 and the paging receiver access number PAN-1 in a scratch pad memory for later use, as will be described below. The telepoint base station then formats the received paging receiver access number PAN-1 of HANDSET-1 together with telepoint telephone access number TTAN-1 for transmission to the paging base station, or paging terminal, at block 734, and then dials the paging terminal using the received PAN-2 paging receiver access number inputted by USER-1. Upon receiving the pager access number PAN-2, the paging terminal connects to the telepoint base station, at block 736. The paging terminal then requests the information to be transmitted, at block 738, which includes the telepoint telephone access number TTAN-1 and the paging receiver access number PAN-1, after which the telepoint base station TBS-1 sends a formatted special data message to the terminal, at block 740. Transmission of the special data message between the telepoint base station TBS-1 and the paging terminal utilizes any of the well known protocols, such as the Motorola Page Entry Terminal (PET) protocol. The paging terminal then receives and validates the special data message, at block 742, and further processes the received special data message into a signaling format, such as being utilized for page transmissions. Following the transmission of the paging message, the handset HANDSET-1 disconnects from the telepoint base station TBS-1, at block 744, to await a return call from the second handset user, as will be described below.

Figure 5:
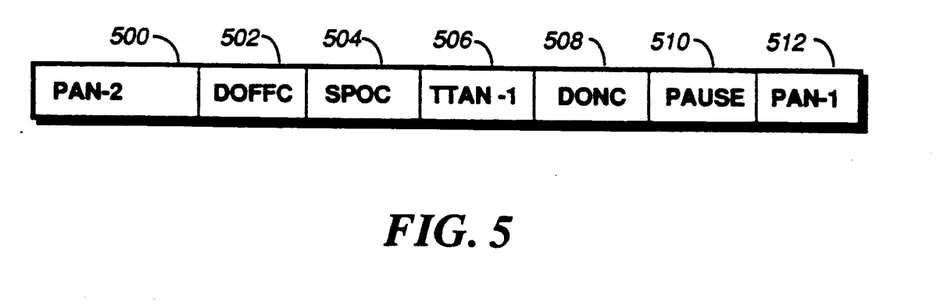
FIG. 5 is an example of the signaling format applicable to the cordless telephone handset of FIG. 4.

Reference is now directed to FIG. 5 which is an example of the format of the special data message applicable in the preferred embodiment of the present invention. The special data message includes the received PAN-2 to provide the address portion 500 of the paging message. Following the address 500 is a special display off character DOFFC 502 which is utilized by the paging receiver portion of the second handset HANDSET-2 to inhibit the display of any following information. Following the special display off character DOFFC 502 is a special service provider option character SPOC 504, which will be described in further detail below, and which provides additional control of the display of the received paging message by HANDSET-2. Following the special service provider option character SPOC 504 is the telepoint telephone access number TTAN-1 506 which identifies the telepoint base station TBS-1 from which the call originated. Following the telepoint telephone access number TTAN-1 506 is a special display on character DONC 508 which terminates the inhibiting of the display of any information to follow. Following the special display on character DONC 508 is the special pause character PAUSE 510 which is used to temporarily suspend the telepoint base station autodialing operation, as will be described below. Following the special pause character PAUSE 510 is the pager access number PAN-1 512 for the first handset HANDSET-1. The special display off character 502, the special service provider's option character 504, the telepoint telephone access number 506, the special display on character 508, the special pause character 510 and the pager access number 512 comprise the message portion of the paging message. The paging terminal, as previously I described, encodes the address and message portions into the signaling protocol in use in the paging system in a manner well known to one of ordinary skill in the art.

Reference is again directed to FIG. 3 in conjunction with FIG. 8A which is a flow diagram illustrating the cordless telephone handset operation in accordance with the preferred embodiment of the present invention for the second CT-2 handset. The paging terminal transmits the encoded data message described above, at block 800 of FIG. 8A, which is received by the pager portion PAGER-2 of the second handset HANDSET-2, at block 802. Following the reception of the encoded data message by PAGER-2, at block 802, the data message is stored, at block 804, and the handset user USER-2 is alerted using any of a number of well known alerting methods, such as audible, visual or tactile, at block 806, indicating that a message has been received. The handset user USER-2 can then recover the data message from memory when it is convenient, at block 808, such as when the handset user is located within range of a second telepoint base station. The message portion of the paging message is evaluated, at block 812 to determine whether the special display off character DOFFC is present in the message. When the special display off character DOFFC is transmitted in the message, only those characters which were received and stored, and for which display is permitted, as described above, are displayed, at block 814. When the display off character DOFFC is not transmitted in the message, as will be described in further detail below, all of the stored message characters which were received and stored are displayed, at block 816. In either instance, the paging access number PAN-1 identifying the paging receiver portion of the handset HANDSET-1 is displayed, allowing the second handset user USER-2 to identify the source of the call.

Reference is again directed to FIG. 3 in conjunction with FIG. 8B which is a further flow diagram illustrating the cordless telephone handset operation in accordance with the preferred embodiment of the present invention for the second CT-2 handset. Specific handset operations are identified by solid line boxes, whereas the telepoint base station operations are identified by dashed line boxes. When the handset user USER-2 is located within range of a second telepoint base station, and USER-2 initiates a return of the call by actuating a return page key sequence, as will be described in detail below, at block 818 of FIG. 8A. The handset HANDSET-2 then initially transmits a link request, at block 820 of FIG. 8B. Transmitted within the link request is the handset portable identification number PID-2. The telepoint base station TBS-2 receives the link request, at block 822 and verifies that the handset user, USER-2, identified by the received PID-2 is authorized to operate in the system. When the handset user is authorized to operate in the system, the telepoint base station TBS-2 then transmits a link grant, at block 826, followed by an authorization request, AUTH_REQ. The handset HANDSET-2 receives the authorization request, AUTH_REQ, at block 828 and then transmits the authorization response, AUTH_RES, at block 830. The authorization response, AUTH_RES, includes the paging access number, or PAN-2, which is pre-programmed into the telepoint registration data field, and which corresponds to the address assigned to the paging receiver portion of the handset. The telepoint base station TBS-2 receives the authorization response, AUTH_RES, at block 832 and among other things, recovers the received PAN-2 from the telepoint registration data field. Following the reception of the authorization response, AUTH_RES, at block 832, the HANDSET-2 recovers the data message information, at block 836, and then transmits at least the stored digits corresponding to the telepoint telephone access number TTAN-1 of the first telepoint base station, the special PAUSE character, and the paging receiver access number PAN-1, at block 838. The telepoint base station TBS-2 then begins to autodial the received telepoint telephone access number TTAN-1, and when the special PAUSE character is detected in the recovered data message, at block 840, the automatic dialing operation of the automatic dialer of the second telepoint base station TBS-2 is temporarily suspended, enabling the public switched telephone network to process the received telepoint telephone access number TTAN-1. The actual operation of the telepoint base station after having been called via the telepoint telephone access number to complete the call will be described below.

Following the processing of the received telepoint telephone access number TTAN-1, the second telepoint base station TBS-2 restarts the automatic dialer in response to a tone prompt received from the first telepoint base station TBS-1, at block 842. The automatic dialer dials the telephone digits corresponding to the PAN-1 of the handset originating the call, at block 844. Upon receiving the paging receiver access number PAN-1, the first telepoint base station TBS-1 searches the scratch pad memory for the PAN-1 to then determine the associated portable identification number PID-1. The first telepoint base station TBS-1 then polls for the handset identified by PID-1 to establish a communication link with the first handset.

When dialing of the telephone number is complete, at block 846, the telepoint base station TBS-2 transmits that dialing is complete, and any non-displayable characters which may have been stored in memory of the second handset HANDSET-2 are erased, at block 848.

When the call is not answered, at block 850, due to the first handset user not responding to the poll, the second handset user then manually hangs up, at block 852. When the call is answered, at block 850, the second handset user USER-2 can converse with the first handset user USER-1 who originated call between the two handset users, both handset user then manually hang up, at block 852.

Figure 4:
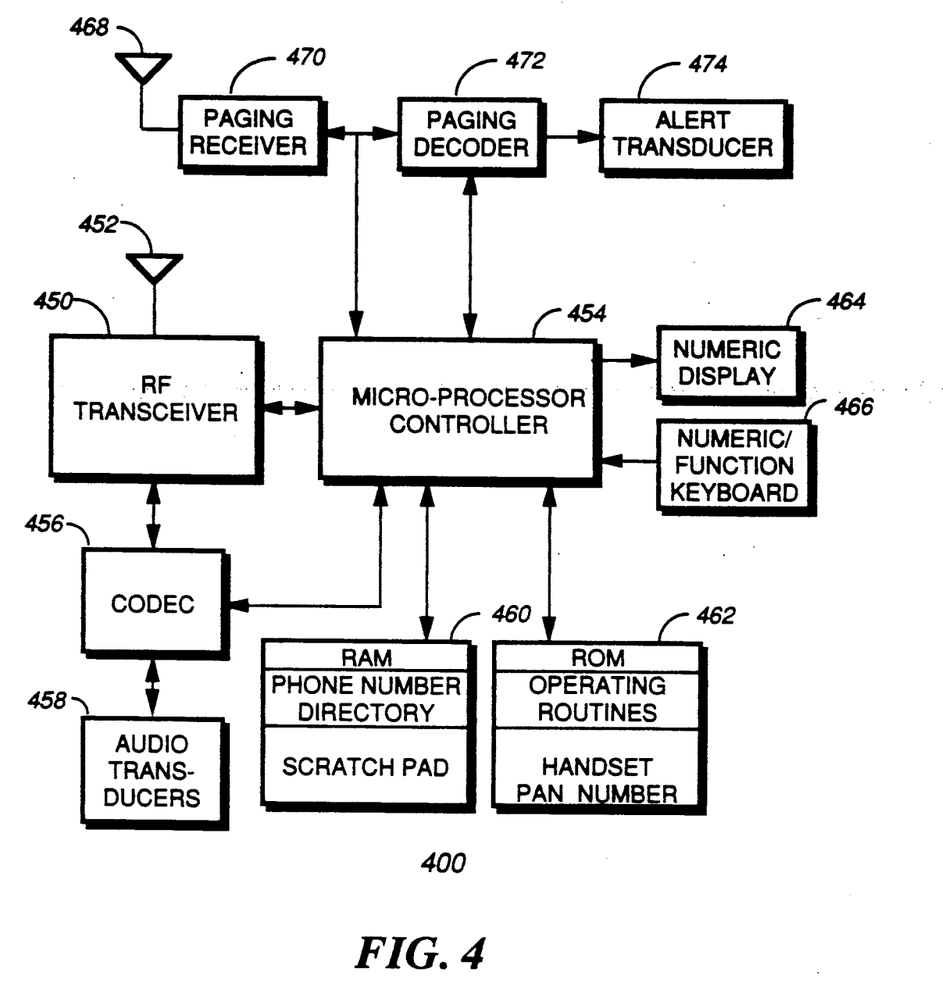
FIG. 4 is an electrical block diagram illustrating a cordless telephone handset constructed in accordance with the preferred embodiment of the present invention.

Reference is directed to FIG. 4 which is an electrical block diagram illustrating a cordless telephone handset 400 constructed in accordance with the preferred embodiment of the present invention. The basic operation of the cordless telephone handset 400 is well known to one of ordinary skill in the art, so only a brief description of the basic operation will be provided herein. The cordless telephone handset 400 includes an antenna 452 which is coupled to a multiple frequency RF transceiver 450 to enable receiving and transmitting data and voice modulated signals. Speech signals are converted to a voice signal in the audio transducer 458 (handset mouthpiece) which is then coupled to a codec 456 which digitizes the voice signal into a digital signal which is coupled to a modulator input of RF transceiver 450. A microprocessor controller 454 is coupled to the RF transceiver 450 for controlling both the transmission and reception of the data and digitized voice information. The microprocessor controller 454 is also coupled to the codec 456 for controlling the digitizing of voice signal and the conversion of the received digitized voice signal into an analog speech signal for reproduction by the audio transducer 458 (handset earpiece). A read only memory (ROM) 462 is used to store the various operating routines which control the handset operation, and further stores the paging access number (PAN) identifying the paging receiver portion of the handset, as described above. A random access memory (RAM) 460 provides a scratch pad memory for storage of the variables utilized in controlling the operation of the handset, as ell as for storing the received telepoint telephone access number TTAN and paging access number PAN, described above. The random access memory 460 also provides for storage of phone number directory information, the entry and recovery of which is controlled by the microprocessor controller 454 using the numeric/function keyboard 466 in a manner well known in the art. A numeric display 464 which is coupled to the microprocessor controller 454 is used to display the phone number directory information, to display the displayable received paging information as described above, and to display a phone number as the number is entered through the numeric/function keyboard 466 in a manner well known in the art. A second antenna 468 may be coupled to the input of a paging receiver 470 enabling the reception of the transmitted paging message, as described above. The output of the paging receiver 470 is coupled to the input of a paging decoder 472 which processes the received paging message information in a manner well known in the art for the paging signaling protocol being used in the transmission of the paging message. The output of the paging decoder provides a control signal output indicating the receipt of the paging message which then enables the microprocessor controller 454 which is also coupled to the output of the paging receiver 470 to receive the message portion of the paging message. It will be appreciated that the microprocessor controller 470 could be programmed to also provide the paging address decoding function, as is also well known in the art.

After the paging message has been received, and the telepoint telephone access number TTAN and paging receiver access number PAN have been stored in memory, an alert signal is generated by the paging decoder 472. The alert signal is coupled to the alert transducer 474 to alert the user of the receipt of a message. It will be appreciated that the alert signal may also be coupled to the audio transducer 458, thereby eliminating the need for a separate transducer circuit. The stored special data message can be read by the user using a key, such as a READ key (not shown) on the numeric/function keyboard 466, enabling the handset user the opportunity to review the received message and to identify the caller from the received pager access number. The numeric/function keyboard also includes a separate key, such as a RETURN PAGE key (not shown) to enable the dialing sequence for dialing the telephone number received in the special data message.

Figure 6:
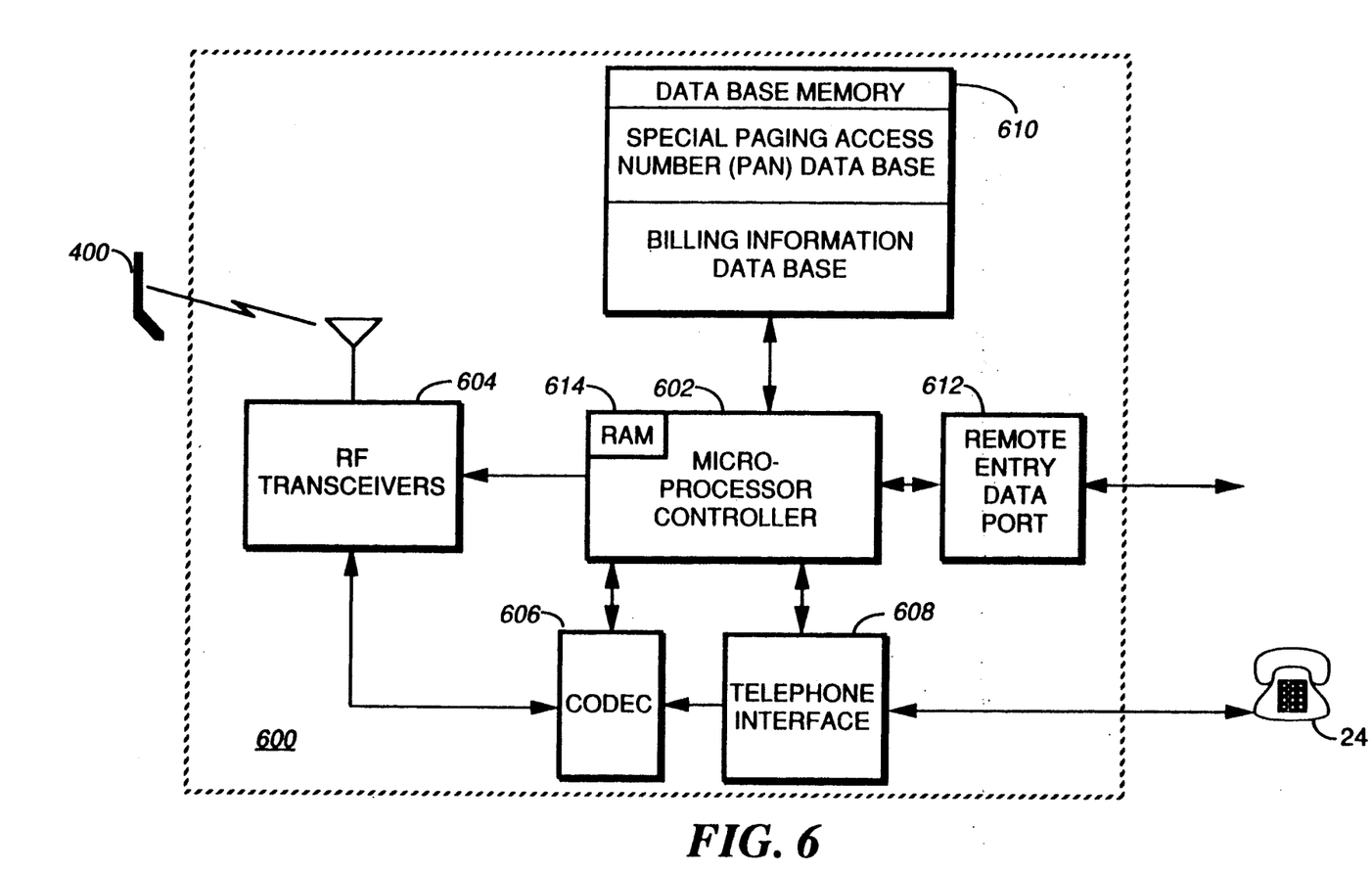
FIG. 6 is an electrical block diagram illustrating a telepoint base station in accordance with the preferred embodiment of the present invention.

Reference is now directed to FIG. 6 which is an electrical block diagram illustrating a telepoint base station in accordance with the preferred embodiment of the present invention. The telepoint base station 600 comprises one or more multiple frequency RF transceivers 604 used to establish communication with the portable radiotelephone handsets 400 in a manner well known in the art. A telephone interface 608 is provided to enable communication with conventional telephones 24, generally through a public switched telephone network (PSTN) in a manner well known in the art. A codec 606 is coupled between the telephone interface 608 and the RF transceivers 604. The codec 606 is used to digitize the speech signals received via the telephone interface 608 into digitized voice signals suitable for transmission by the RF transceivers 604 in a manner well known in the art. The codec 606 is further used to convert the digitized voice signals received via the RF transceivers 604 into analog speech signals suitable for transmission over the public switched telephone network also in a manner well known in the art. A microprocessor controller 602 is utilized to control the call processing through the telephone interface 608, codec 606 and RF transceivers 604 in a manner well known in the art. A data base memory 610 is coupled to the microprocessor controller 602 and is utilized to store such information as required for the billing information data base, is used to store those telephone hunt group numbers identifying handsets having an integral paging receiver in a special paging access number data base, and is also used to store the telepoint base station's telepoint telephone access number (TTAN). The purpose for the billing information data base is well known in the art, and the function of the special paging access number data base was previously described above. A random access memory 614, which may be a portion of the data base memory 610 is utilized as the scratch pad re memory for storing the received portable identification numbers (PID-1 or PID-2), and the corresponding paging receiver access numbers (PAN-1 or PAN-2), as described above. A remote entry data port 612 is also coupled to the microprocessor controller 602 and provides direct local input into the telepoint base station for monitoring or controlling the base station operation in a manner well known in the art.

Figure 9:
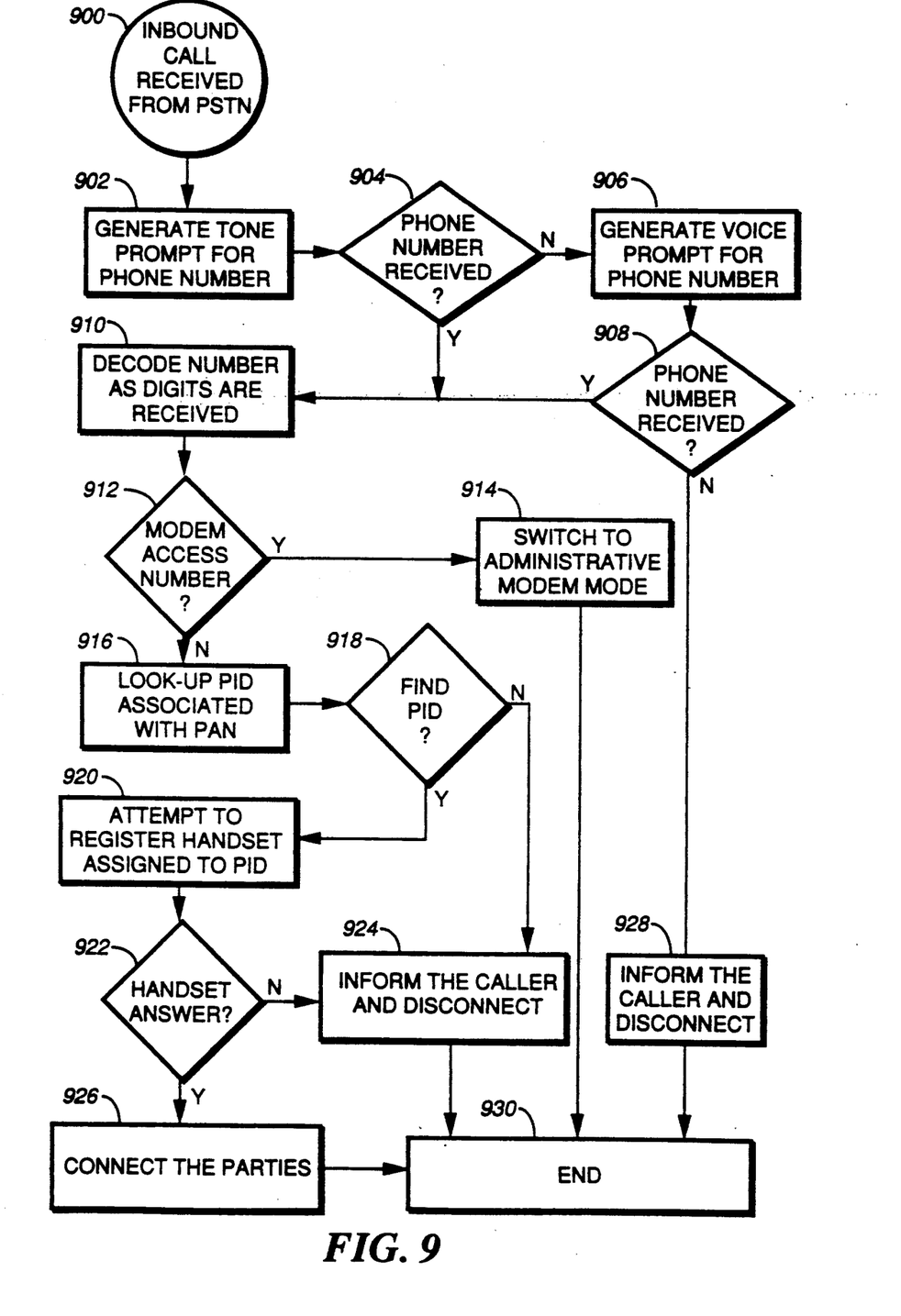
FIG. 9 is a flow chart illustrating the telepoint base station inbound call handling operation in accordance with the preferred embodiment of the present invention.

Reference is now directed to FIG. 9 which is a flow chart illustrating the telepoint base station inbound call handling operation in accordance with the preferred embodiment of the present invention. When an inbound call is received at a telepoint base station as described in FIG. 6 from the public switched telephone network (PSTN), at block 900, the microprocessor controller generates a tone prompt requesting the entry of telephone number information, at block 902. As will become more apparent from the description to follow, the call can represent an automatic request from the service operator requesting a download of the daily billing information data base, or another telepoint base station requesting interconnection to complete a call as described above. When the phone number information is not received within a predetermined time interval, at block 904, which indicates the inbound call may be from a different source than described above, the microprocessor controller again prompts for entry of the telephone number information, at block 906. As shown, the second prompt is via a voice prompt, since the inbound call may originate directly over the public switch telephone network, such as in those instances where direct caller access is provided directly from a human caller. Again, when the phone number information is not received within a predetermined time period, at block 908, the microprocessor controller then generates an advisory prompt, at block 928, and disconnects the telepoint base station from the incoming line.

When the phone number information is received, at block 904 or block 908, the microprocessor controller begins decoding the digits as the digits are received, at block 910. When the received telephone number is the modem access number, indicating the source is from the central control station, at block 912, the microprocessor controller switches the telepoint base station operation to the administrative modem mode, at block 914. In the administrative modem mode, the information stored in the billing information data based is recovered and transmitted back to the central station in a manner well known in the art. Upon completion of the transfer of information from the billing information data base, the microprocessor controller would disconnect the telepoint base station from the incoming line.

When the received telephone number is not the modem access number, at block 912, but rather is a paging receiver access number belonging to a telephone hunt group identifying handset with an integral paging receiver, the microprocessor controller accesses the special paging access number data base to recover the portable identification number (PID) associated with the received paging receiver access number (PAN), at block 916. When the microprocessor controller does not find a portable identification number (PID) associated with the received paging receiver access number (PAN), at block 918, the microprocessor controller generates an advisory prompt, at block 924, and disconnects the telepoint base station from the incoming line. When the microprocessor controller finds a portable identification number (PID) associated with the received paging receiver access number (PAN), at block 918, the microprocessor controller attempts to register the handset assigned to the portable identification number, at block 920. When the microprocessor controller is unable to register the handset within a predetermined number of registration attempts, at block 922, indicated by the handset failing to answer the poll for registration, the microprocessor controller generates an advisory prompt, at block 924, and disconnects the telepoint base station from the incoming line. When the microprocessor controller is able to register the handset, at block 922, the microprocessor controller connects the registered handset to the incoming line, at block 926, completing the connection between the parties. Following completion of the call, when one of the parties disconnects, the microprocessor controller returns to a standby condition awaiting another call.

Reference is again directed to FIG. 5 which is the example of the format of the special data message applicable in the preferred embodiment of the present invention. The format of the special data message presented enables the inhibiting of the display of the received telepoint telephone access number by the handset in those systems in which the system operator desires to keep such information confidential. It will be appreciated that if the system operator does not desire to keep the telepoint telephone access number confidential, the special display off character DOFFC 502, the service provider's option character 504, and the special display on character DONC 508 would be eliminated from the message, and only the telepoint telephone access number TTAN-1, the special PAUSE character, and the paging receiver access number PAN-1 would be transmitted in the message portion of the special data message.

With regards to the service provider's option character SPOC 504, this character allows the service provider to provide varying levels of security with respect to the type of the telepoint base stations which can be utilized for dialing the telepoint telephone access number TTAN-1 506. As was described above, the call can be returned from different type telepoint base stations. However, there may be instances when the service provider would wish to prohibit dialing through certain telepoint base stations for fear of exposing the service provider's base station to electronic vandalism, or the like. Through the use of the service provider's option character, the type of telepoint base station for which dialing of the receive telepoint telephone access number is permitted, as described above, can be controlled. One example of such use of the service provider's option character is shown in Table I below.

TABLE I

| SPOC | Description |
|---|---|
| 0 | permit from Telepoint Base only |
| 1 | permit from Telepoint or Business Base only |
| 2 | permit from any kind of base |
| 3 | permit from Telepoint Base of Handset User Service Provider Only |

As shown in TABLE I, an option code "0" indicates the service provider would permit the handset to communicate only with a telepoint base station, communication to other base stations, such as personal or business base stations would be prohibited. An option code "138 indicates that the service provider would permit the handset to communicate with a telepoint or business base station only, communication to other types base stations, such as personal base stations would be prohibited. An option code "2" indicates that the service provider would permit the handset to communicate with any kind of telepoint base station. And an option code "3" indicates that the service provider would permit the handset to communicate only with a telepoint base station which belongs to the service provider, communication to other types base stations, or base stations belonging to other service providers would be prohibited. It will be appreciated, that from the example provided above, other restrictions can also be set up, depending upon the particular service provider's needs.

A system and method has been described which enables a first portable radiotelephone handset communicating through a first telepoint base station to quickly and efficiently communicate to a second portable radiotelephone handset communicating through a second telepoint base station without the normal problems associated with locating the second portable radiotelephone handset, as has been commonplace in prior radiotelephone communication systems.

We claim:

1. In a communication system providing at least cordless radiotelephone operation and having a plurality of telepoint base stations geographically located therein for providing communication between a plurality of portable radiotelephone transceivers and a public switched telephone network, a method for providing communication between transceivers having paging receivers coupled thereto and operating within the communication system comprises the steps of:

transmitting a paging message from a paging system which is transmitted substantially throughout the communication system in response to a first transceiver registering with a first telepoint base station and requesting communication with a second transceiver, the paging message including at least access information identifying the first telepoint base station and access information identifying the first transceiver;

establishing a communication link with the first telepoint base station from a second telepoint base station registering with the second transceiver in response to the same receiving the paging message identifying the first telepoint base station; and thereafter requesting registration of the first complete the communication link between the first and second transceivers in response to the first telepoint base station receiving the access information of the first transceiver.

2. In a communication system providing at least cordless radiotelephone operation and having a plurality of telepoint base stations geographically located therein for providing communication between a plurality of portable radiotelephone transceivers and a public switched telephone network, a system for establishing communication between transceivers having paging receivers coupled thereto comprises:

means for transmitting a paging message from a paging system which is transmitted substantially throughout the communication system in response to a first transceiver registering with a first telepoint base station and requesting communication with a second transceiver, the paging message including at least access information identifying the first telepoint base station and access information identifying the first transceiver;

means for establishing a communication link with the first telepoint base station from a second telepoint base station registering with the second transceiver in response to the same receiving the paging message identifying the first telepoint base station; and means for requesting registration of the first transceiver with the first telepoint base station to complete the communication link between the first and second transceivers in response to the first telepoint base station receiving the access information of the first transceiver.

3. In a communication system providing at least cordless radiotelephone operation and having a plurality of telepoint base stations geographically located therein for providing communication between a plurality of portable radiotelephone transceivers and a public switched telephone network, a method for providing communication between transceivers having a paging receiver coupled thereto comprises the steps of:

registering a first transceiver with a first telepoint base station;

transmitting, from the first transceiver, user inputted access information identifying a second transceiver to which communication is desired;

establishing communication between the first telepoint base station and a paging system in response to receiving the access information identifying the second transceiver;

transmitting a paging message directed to the second transceiver, the paging message including at least access information identifying the first telepoint base station and access information identifying the first transceiver;

registering the second transceiver with a second telepoint base station in response to receiving the paging message;

transmitting, from the second transceiver, the received access information identifying the first telepoint base station and the first transceiver;

establishing a communication link between the second telepoint base station and the first telepoint base station in response to receiving the access information identifying the first telepoint base station;

transmitting the access information identifying the first transceiver to the first telepoint base station; and requesting registration of the first transceiver at the first telepoint base station in response to the received access information identifying the first transceiver to enable a completion of the communication between the first and second transceivers.

4. The method for providing communication between portable radiotelephone transceivers according to claim 3, wherein said step of registering the first transceiver at the first telepoint base station comprises the steps of:

transmitting, from the first transceiver, a portable identification number identifying the same; and receiving the portable identification number to enable registration at the first telepoint base station.

5. The method for providing communication between portable radiotelephone transceivers according to claim 4, wherein said step of registering further comprises the step of determining access information identifying the first transceiver which corresponds to the received portable identification number.

6. The method for providing communication between portable radiotelephone transceivers according to claim 5, further comprising the step of storing the received portable identification number and the corresponding access information identifying the first and second transceivers within the first telepoint base station.

7. The method for providing communication between portable radiotelephone transceivers according to claim 3, wherein said step of transmitting a paging message comprises the steps of:

encoding the access information identifying the second transceiver to provide an address portion of the paging message; and encoding the access information identifying the first telepoint base station and the access information identifying the first transceiver to provide a message portion of the paging message.

8. The method for providing communication between portable radiotelephone transceivers according to claim 3, wherein said step of registering the second transceiver comprises the steps of:

transmitting from the second transceiver a portable identification number identifying the same; and receiving the portable identification number to enable registration at the second telepoint base station.

9. In a communication system providing at least cordless radiotelephone operation and having a plurality of telepoint base stations geographically located therein for providing communication between a plurality of portable radiotelephone transceivers and a public switched telephone network, a system for establishing communication between transceivers having a paging receiver coupled thereto comprises:

a first telepoint base station comprising means for registering a first transceiver of the plurality of portable radiotelephone transceivers for enabling the transmission of access information identifying a second transceiver to which communication is desired, means for establishing a connection with a paging system over a communication network for enabling a paging message transmission directed to said second transceiver, the paging message transmission including at least access information identifying said first telepoint base station and access information identifying said first transceiver; and at least a second telepoint base station comprising means for registering said second transceiver in response to the same receiving the paging message and for enabling the transmission of access information identifying said first transceiver to which communication is desired, and means for establishing a communication link with said first telepoint base station in response to registering said second transceiver, and for sending to said first telepoint base station the access information identifying said first transceiver, said first telepoint base station further comprising means for requesting registration of said first transceiver in response to the received access information identifying said first transceiver to enable a completion of the communication between said first and second transceivers.

10. The system for providing communication between portable radiotelephone transceivers according to claim 9, wherein said paging system comprises:

transmitter means for transmitting the paging message; and a paging terminal for providing control of said transmitter means to provide a wide-area paging system covering substantially the same coverage area as provided by said communication system.

11. The system for providing communication between portable radiotelephone transceivers according to claim 9, wherein said communication network comprises a public switched telephone network.

12. The system for providing communication between portable radiotelephone transceivers according to claim 9, wherein said communication network comprises radio frequency links.

13. The system for providing communication between portable radiotelephone transceivers according to claim 9, wherein said means for registering said first transceiver comprises:
- means for transmitting a portable identification number identifying the first transceiver; and
- means for receiving a portable identification number identifying said first transceiver to enable registration.

14. The system for providing communication between portable radiotelephone transceivers according to claim 13, wherein said first telepoint base station further comprises:
- means for storing a table of portable identification numbers and associated access information identifying said plurality of transceivers; and
- means, coupled to said storing means, for determining the access information identifying said first transceiver which corresponds to the received portable identification number.

15. The system for providing communication between portable radiotelephone transceivers according to claim 14, wherein said first telepoint base station further comprises:
- means for storing the received portable identification number and the corresponding access information identifying said first transceiver.

16. The system for providing communication between portable radiotelephone transceivers according to claim 9, wherein said means for enabling the transmission of a paging message comprises:
- means for encoding the access information identifying said second transceiver to provide an address portion of the paging message; and
- means for encoding the access information identifying said first telepoint base station and the access information identifying said first transceiver to provide a message portion of the paging message.

17. The system for providing communication between 1 portable radiotelephone transceivers according to claim 9, wherein said means for registering said second transceiver comprises:
- means for transmitting a portable identification number identifying the second transceiver; and
- means for receiving a portable identification number identifying said second transceiver to enable registration with said second telepoint base station.

18. A portable radiotelephone transceiver for operation in a communication system providing at least cordless radiotelephone operation and having a plurality of telepoint base stations geographically located therein for providing communication between a plurality of portable radiotelephone transceivers and a public switched telephone network, and for further providing communication between portable radiotelephone transceivers, said portable radiotelephone transceivers comprising:
- means for receiving a paging message, the message including at least access information identifying a first telepoint base station and access information identifying a first portable radiotelephone transceiver requesting communication;
- means for storing the received access information identifying the first telepoint base station and access information identifying the first portable radiotelephone transceiver;
- means for displaying at least the received access information identifying the first portable radiotelephone transceiver; and
- means for transmitting the received access information identifying the first telepoint base station and the first portable radiotelephone transceiver to a second telepoint base station to thereafter enable communication between said portable radiotelephone transceivers.

19. The portable radiotelephone transceiver according to claim 18 wherein said paging message further includes information for controlling the display of the received access information, and wherein said display means is responsive to the control information for inhibiting the display of the access information identifying the first telepoint base station.

20. The portable radiotelephone transceiver according to claim 18 wherein said means for transmitting the received access information comprises:
- switch means; and
- means, responsive to said switch means, for recovering the access information identifying the first telepoint base station from said storing means; and
- transmitter means for transmitting the access information identifying the first telepoint base station and the first portable radiotelephone transceiver.

21. The portable radiotelephone transceiver according to claim 18 further comprising means for registering the portable radiotelephone transceiver with a telepoint base station.

22. The portable radiotelephone transceiver according to claim 21, wherein characteristics of the telepoint base stations are transmitted during registration, and wherein said means for registering is responsive to the received characteristics for generating an identification signal in response thereto, and wherein said paging message further includes information for selectively controlling the transmission of the received access information based on the received characteristics, and wherein said portable radiotelephone transceiver further comprises means responsive to the identification signal for selectively controlling the transmission of the access information identifying the first telepoint base station.

* * * * *

UNITED STATES PATENT AND TRADEMARK OFFICE
CERTIFICATE OF CORRECTION

PATENT NO. : 5,202,912
DATED : April 13, 1993
INVENTOR(S) : Breeden et al.

It is certified that error appears in the above-identified patent and that said Letters Patent is hereby corrected as shown below:

Col. 12, line 34, please insert --transceiver with the first telepoint base station to-- after "first".

Signed and Sealed this

Twenty-ninth Day of March, 1994

Attest:

BRUCE LEHMAN

Attesting Officer   Commissioner of Patents and Trademarks